Dec. 22, 1970   G. V. WOODLING   3,549,284
SELF-TIMING MEANS FOR ROTARY VALVE
IN FLUID PRESSURE DEVICE
Filed Feb. 18, 1969   2 Sheets-Sheet 1
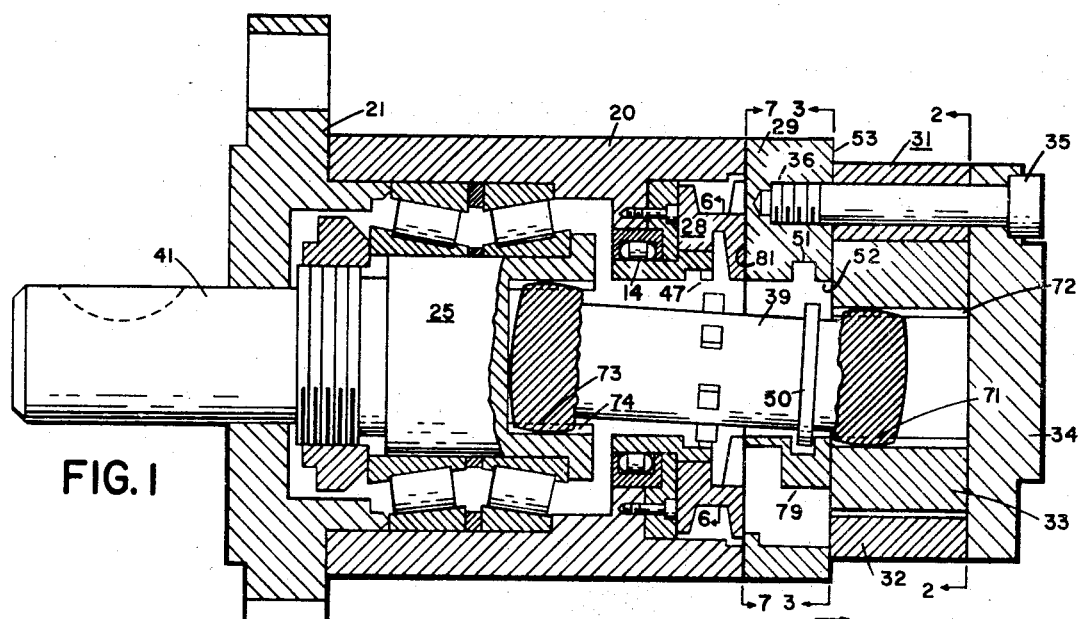
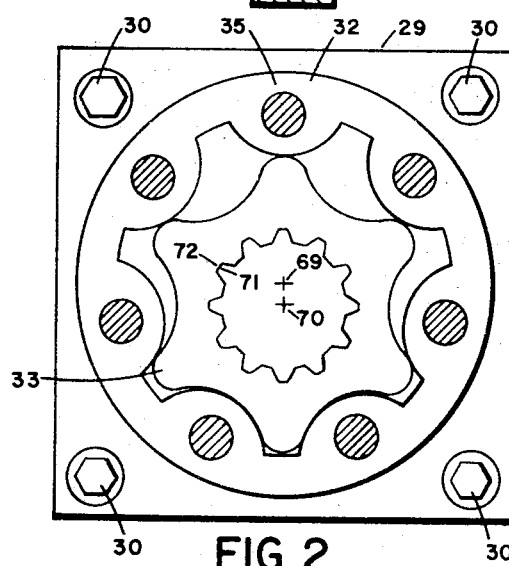
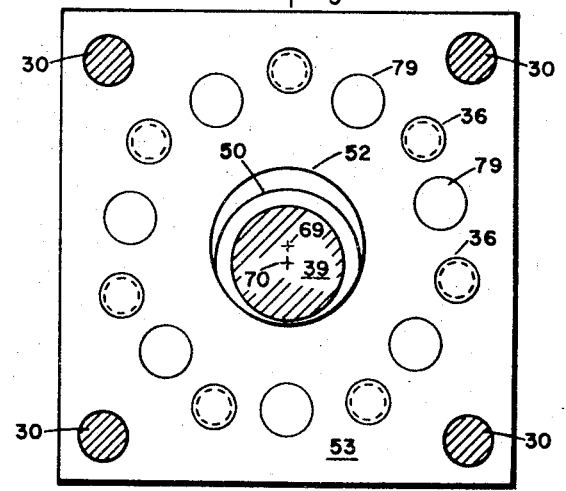
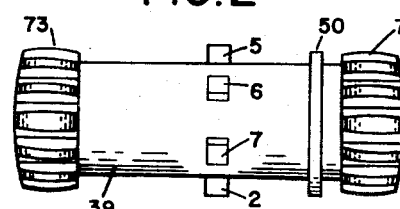
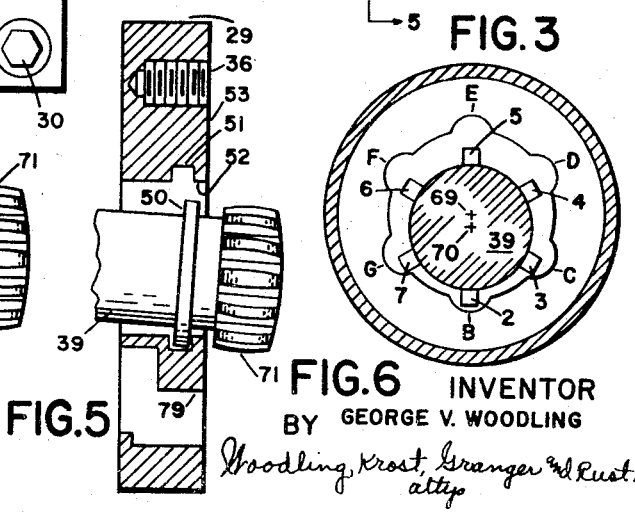
INVENTOR
BY GEORGE V. WOODLING
Woodling, Krost, Granger and Rust.
attys Dec. 22, 1970   G. V. WOODLING   3,549,284
SELF-TIMING MEANS FOR ROTARY VALVE
IN FLUID PRESSURE DEVICE
Filed Feb. 18, 1969   2 Sheets-Sheet 2

INVENTOR.
GEORGE V. WOODLING
BY

United States Patent Office 3,549,284
Patented Dec. 22, 1970

3,549,284
SELF-TIMING MEANS FOR ROTARY VALVE IN
FLUID PRESSURE DEVICE
George V. Woodling, 22077 W. Lake Road,
Rocky River, Ohio 44116
Filed Feb. 18, 1969, Ser. No. 800,126
Int. Cl. F01c 1/10
U.S. Cl. 418—61                               5 Claims

ABSTRACT OF THE DISCLOSURE

Self-timing means to insure correct timing of a rotary valve with respect to rotor means of a stator-rotor mechanism in a fluid pressure device. The stator-rotor mechanism includes stator means in which said rotor means is orbitally mounted. The self-timing means includes a stationary member to which said stator means may be mounted and an orbital shaft common to both said rotary valve and said rotor means. The shaft extends through a shaft opening in said stationary member. The shaft opening has internal wall means therein confronted by external wall means on said orbital shaft to effect a confining wall relationship therebetween in successive order as said orbital shaft operates therein. The confining wall relationship self-locates the shaft with respect to the rotor means in substantially a correct timed-position, whereby the rotary valve is automatically self-timed with respect to said rotor means upon assembly of said rotor means on said self-located shaft and within said stator means for operation therein.

BACKGROUND OF THE INVENTION

In a fluid pressure device including a stator-rotor mechanism, having stator and rotor means, a rotary valve is disposed to control the entrance of fluid to and the exit of fluid from the stator-rotor mechanism. The rotary valve is driven by an actuating orbital shaft having an operative connection with the rotor means. In practice, the operative connection comprises female spline teeth in the rotary means and male spline teeth on the shaft which fit within the female spline teeth. The male and female spline teeth are angularly indexible with respect to each other and have a plurality of selectable angular positions therebetween to facilitate the timing of the rotary valve. However, in assembly, there is no positive assurance that the spline teeth will be indexed properly to give correct timing of the rotary valve. Of all the indexible positions, there is only one position which will give correct timing. Controlled manufacturing procedures are ordinarily sufficient to effect correct timing in the factory, but not always. The main problem arises not so much in the factory, but in the field where inexperienced personnel may be called upon to exchange a worn stator-rotor mechanism for a new one. Here, the timing problem is more demanding.

Accordingly, an object of my invention is to provide a positive built-in arrangement to insure correct timing of the rotary valve.

Another object is to make it impossible to assemble the stator-rotor mechanism for operation, unless the timing is correct.

Another object is the provision of a built-in self-timing means to insure correct timing of the rotary valve.

Another object is to self-locate the orbital shaft and the male spline teeth thereon in substantially a correct timed-position with respect to the rotary valve, whereby the rotary valve is automatically self-timed with respect to the rotor means upon assembly of the rotary means on the self-located orbital shaft and within the stator means for operation therein.

SUMMARY OF THE INVENTION

The invention constitutes self-timing means to insure correct timing of rotary valve means in a fluid pressure device, said fluid pressure device including a stator-rotor mechanism having stator and rotor means, said stator means having substantially a fixed axis and ($n$) number of internal teeth, said rotor means having a movable axis disposed for orbital movement about said fixed axis and having ($n-1$) number of external teeth disposed to intermesh with said internal teeth of said stator means, said rotor means being also disposed for rotational movement about its own axis, whereby said rotor means has a combined rotor movement comprising said orbital and rotational movements, said self-timing means comprising stationary member means disposed in a stationary position relative to said stator means and shaft means common to both said rotary valve means and said rotor means, said shaft means having first connection means with said rotor means and second connection means with said rotary valve means to rotate same, said first connection means comprising female spline teeth in said rotor means and male spline teeth on said shaft means, said female and male spline teeth being angularly indexible with respect to each other and having a plurality of selectable angular positions therebetween, said shaft means having a combined shaft movement partaking that of said rotor means, said stationary member means having internal wall means defining a shaft opening, said internal wall means having ($n$) number of internal wall portions, said shaft means having ($n-1$) number of external wall portions, said internal wall portions and said external wall portions confronting each other and effecting a confining wall relationship therebetween in successive order as said shaft means moves through said combined shaft movement, said confining wall relationship self-locating said shaft means and said male spline teeth thereon in sub-male spline teeth thereon in substantially a correct timed-position with respect to said rotary valve means, whereby said rotary valve means is automatically self-timed with respect to said rotor means upon assembly of said rotor means on said self-located shaft means and within said stator means for operation therein.

Other objects and a fuller understanding of this invention may be had by referring to the following description and claims, taken in conjunction with the accompanying drawings, in which:

FIG. 1 is an elongated view, partly in section, of an orbital fluid pressure device embodying the features of my invention;

FIG. 2 is a view taken along the line 2—2 of FIG. 1 under the end cap, showing the stator-rotor mechanism;

FIG. 3 is a view taken along the line 3—3 of FIG. 1, showing the stator-motor side of a stationary valve member, the orbital shaft being shown in section;

FIG. 4 is a side view of the orbital shaft and shows an annular;

FIG. 5 is a cross-sectional view taken along the line 5—5 of FIG. 3, showing the right-hand end portion of the orbital shaft orbitally disposed in a centrally disposed shaft opening in the stationary valve member;

FIG. 6 is a view looking at the right-hand side of the drive means between the orbital shaft and the rotary valve in FIG. 1, taken along the line 6—6 thereof, showing six regional drive locations;

DESCRIPTION OF THE PREFERRED EMBODIMENT

Figure 7:
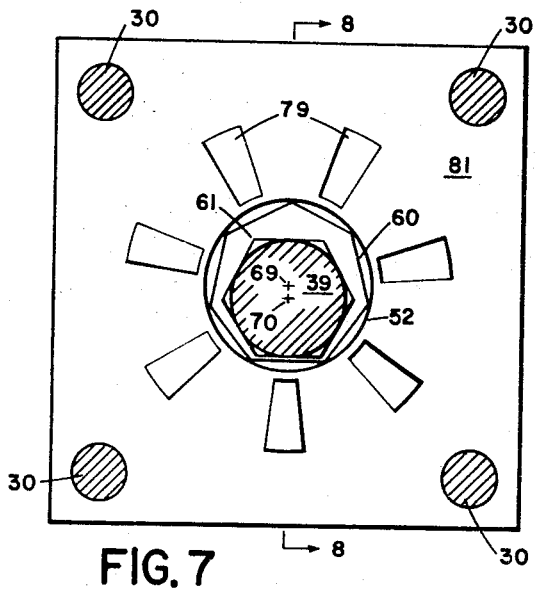
FIG. 7 is a side view of a stationary valve, taken along the line 7—7 of FIG. 1, showing the improvement of the self-timing means.
Figure 8:
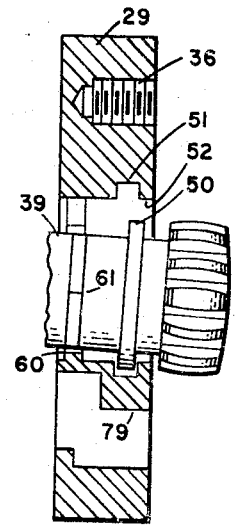
FIG. 8 is a view similar to FIG. 5, with the self-timing means incorporated therein.
Figure 9:
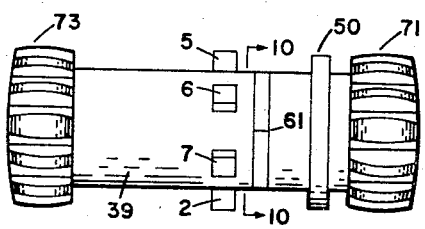
FIG. 9 is a side view similar to FIG. 4, with the self-timing means provided thereon.
Figure 10:
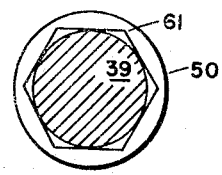
FIG. 10 is a cross-sectional view, taken along the line 10—10 of FIG. 9.

The figures of the drawing show a preferred embodiment of the invention but this is only by way of illustration; it is not to be taken as limiting, the invention being limited only by the hereinafter appended claims.

With reference to the drawings, the construction of my orbital fluid pressure device comprises generally a main housing 20 having substantially a square cross-section. A mounting flange 21 is secured to the left-hand end of the housing. The housing 20 is hollow from end-to-end. Rotatively mounted in the left-hand end portion of the housing is a main shaft 25 having an axis substantially coinciding with the fixed axis. As illustrated, the main shaft 25 is rotatively mounted in tapered roller bearings. An external shaft 41 comprises an integral part of the main shaft 25. A rotary valve 28, rotatively mounted on bearings 14, is mounted in the right hand end portion of the main housing 20 and sealingly engages a stationary face 81 of a stationary valve member 29 connected to the right-hand end face of the main housing by screws 30. Attached to the right-hand face 53 of the stationary valve member 29, is a stator-rotor mechanism 31 comprising stator means 32 and rotor means 33. An end cap 34 encloses the stator-rotor mechanism. As illustrated, screws 35 secure the stator-rotor mechanism and the end cap 34 to the stationary valve member 29. The screws 35 threadably engage threaded holes 36 in the stationary valve member. Although not limited thereto, the stator has seven internal teeth and the rotor has six external teeth intermeshing with the stator internal teeth. The stator may be described as having ($n$) number of internal teeth and the rotor may be described as having ($n-1$) number of external teeth. The intermeshing teeth upon relative movement therebetween define operating fluid chambers. The rotor has an axis 70 which orbits about the fixed axis 69 of the stator. The rotor 33 also rotates about its own axis. The stator internal teeth constitutes outer wall means of the operating fluid chambers. The rotor external teeth constitute inner wall means of the operating fluid chambers. The rotation of the rotary valve 28 relative to the stationary valve 29 controls the entrance of fluid to and the exit of fluid from the operating fluid chambers through fluid passages 79 in the stationary valve member 29. The rotary valve 28 is driven by a wobble or orbital shaft 39 which also interconnects the main shaft 25 and the rotor 33. As shown in FIG. 1, the right-hand end portion of the wobble shaft 39 extends through a shaft hole 52 in the stationary valve member 29 and has an operative connection with the rotor 33. The shaft hole 52 has a reference axis substantially in axial alignment with the fixed axis of the stator. Thus, the axis of the wobble shaft 39 orbits around the reference axis, the same as the rotor axis orbits around the stator axis. The operative connection comprises male spline teeth 71 on the wobble shaft which interfittingly engage female spline teeth 72 in the rotor. Thus, the right-hand end portion of the wobble shaft 39 is disposed for rotational movement about its own axis and for orbital movement about the fixed axis of the stator. The connection means between the left-hand end portion of the wobble shaft and the main shaft 25 comprises male spline teeth 73 on the wobble shaft which interfittingly engage female spline teeth 74 in the central core of the main shaft. Thus, the left-hand end portion of the wobble shaft is disposed for rotational movement only about the fixed axis of the stator.

The wobble shaft 39 is connected to drive the rotary valve 28 through one rotation for each rotation of the wobble shaft. The drive is shown in FIG. 6 and may be substantially the same as that shown and described in FIGS. 16–18 in my pending application, Ser. No. 797,223, filed Feb. 6, 1969. The drive means comprises a plurality of drive follower means B to G disposed at circumferentially spaced regional locations internally of the rotary valve and a plurality of drive actuating means 2 to 7 circumferentially disposed about the orbital shaft 39. The drive follower means B to G are circumferentially disposed with reference to the first axis about which the rotary valve rotates and the drive actuating means 2 to 7 are circumferentially disposed with reference to the shaft (second) axis. The drive follower means B to G comprise female wall means in the form of substantially a semi-circle provided in an internal rim 47 within the rotary valve. The drive actuating means 2 to 7 comprise male wall means in the form of lugs provided on the outside of the actuating shaft. The diameter of the top of the lugs may be substantially the same as the diameter of the male gear teeth 71 and 73, whereby the lugs as well as the male gear teeth may pass through the central opening in the stationary valve and in the rotary valve. The female wall means and the male wall means are preferably six in number, being the same in number as the external teeth of the rotor 33 and may be designated as ($n-1$) in number. The female wall means are circumferentially spaced apart from each other at substantially equal intervals (sixty degrees) about the first axis and the male wall means are circumferentially spaced apart from each other at substantially equal intervals (sixty degrees) about the shaft (second) axis. The drive actuating means 2 to 7 (male wall means) and the drive follower means B to G (female wall means) respectively engage each other in successive order at the regional locations with the respective drive means at each regional location constituting a pair of regional drive means for transmitting a torque therebetween in response to the combined movement of the orbital shaft 39.

The drive means thus described constitutes universal drive means and provides for rotating the rotary valve means relative to the stationary valve means once for each rotation of the wobble shaft 39. The operation of the rotary valve means is independent of the load and thrust on the main shaft. The fluid may flow through the drive means as open spaces are needed to accommodate for the flow of fluid therethrough.

Relative axial movement may occur between the male and female spline teeth connections, and in this invention, confinement or axial limit means are provided to limit such relative axial movement. In FIGS. 4 and 5, the confinement means comprises abutment means in the form of an annular shoulder 50 on the wobble shaft 39 which is disposed to orbitally fit within an annular recess 51 provided inside of a centrally disposed shaft hole 52 in the stationary valve member 29, see FIG. 5. The interengagement between the side walls of the shoulder 50 and the side walls of the recess 51 limits the relative axial movement between the male and female spline teeth.

The orbital shaft 39 may be inserted in the hole 52 of the rotary valve 29 in the normal manner without any obstruction from the annular shoulder 50, since its outside diameter is less than the diameter of the hole 52. It is the orbital position of the rotor means 33 which holds the annular shoulder 50 within the recess 51. There is always at least some portion of the annular shoulder 50 engaging a side wall of the recess 51. This interengagement of the side walls limits the extent that the orbital shaft may move in an axial direction and makes it possible to interchange stator-rotor mechanism of variable width. Thus, if it were not for my axial limit means, it would be possible for the orbital shaft 39 to work its way to the right in FIG. 1 until it hit the end cap 34, thereby causing the male and female spline teeth 73 and 74 to lose their full engagement width for transmitting full torque to the main shaft 25.

FIGS. 7 to 10 show the improvement of the self-timing means and comprises the addition of internal wall means 60 within the shaft opening 52, and external wall means 61 on the orbital shaft 39. The internal wall means 60 comprises a polygon having (n) number of sides or internal wall portions. The small notches are in the internal polygon wall portions of FIG. 7 are to provide space for the male spline teeth on the orbital shaft to pass therethrough. Being small, the notches are not shown in FIG. 7. Nor do they interfere with the operation of the device. The external wall means 61 also comprises a polygon having (n—1) number of sides or external wall portions. The internal wall portions and the external wall portions confront each other and effect a hugging confining wall relationship therebetween in successive order as the orbital shaft 39, moves through its combined movement comprising the orbital and rotational movements. The confining wall relationship self-locates the shaft with the male spline teeth thereon in substantially a correct timed-position with respect to the rotary valve, whereby the rotary valve is automatically self-timed with respect to the rotor means upon assembly of the rotor means on the self-located shaft and within the stator means for operation therein. In such assembly, the rotor means will not fit within the stator means for operation unless the female spline teeth are correctly indexed with respect to the self-located male teeth. In assembly, it is only necessary for the assemblyman to index the female spline teeth around the male spline teeth, trying one after the other, until the rotor means can be inserted into the stator means for operation therein. Of all the indexible position, there is only one position where the rotor means may be inserted into the stator means for operation, and that is the position where the rotary valve means is correctly timed with respect to the rotor means. In essence, the self-timing means functions as a built-in go and no-go gage, where the parts will not go together unless correct timing is effected.

Figure 11:
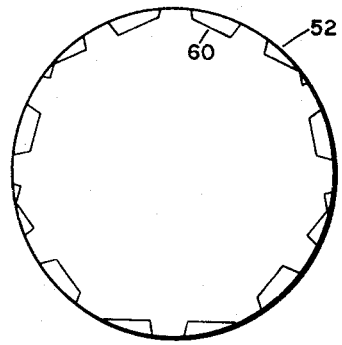
FIG. 11 is an enlarged view of the shaft opening only in FIG. 7, showing the internal polygon sides with notches therein to allow the male spline teeth on the orbital shaft to pass therethrough.

The stationary valve member 29 is arranged so that it is always mounted to the end of the main body 20 in the same relative angular position, whereby the polygon sides of the internal wall means 60 always occupy the same relative position with respect to the polygon sides of the external wall means 61 on the shaft. To this end, one of the four holes for the cap screws 30 may be disposed slightly out of alignment with respect to the other three holes, whereby the stationary valve member 29 may be mounted in only one position with respect to the end of the main body 20. The confining wall relationship between the hugging confronting sides of the internal and external wall means 60 and 61 need not be too close, so long as the circumferential tolerance therebetween is less than the circumferential width of a spline tooth. With this arrangement, the indexing of an incorrect spline tooth is impossible, because with an incorrectly indexed spline tooth the rotor means cannot be assembled on the self-located shaft and within the stator means for operation therein. The small internal notches not shown in FIG. 7, are shown in the enlarged view in FIG. 11. The notches provide space for the male spline teeth to pass therethrough.

Although this invention has been described in its preferred form with a certain degree of particularity, it is understood that the present disclosure of the preferred form has been made only by way of example and that numerous changes in the details of construction and the combination and arrangement of parts maye be resorted to without departing from the spirit and the scope of the invention as hereinafter claimed.

What is claimed is:

1. Self-timing means to insure correct timing of rotary valve means in a fluid pressure device, said fluid pressure device including a stator-rotor mechanism having stator and rotor means, said stator means having substantially a fixed axis and (n) number of internal teeth, said rotor means having a movable axis disposed for orbital movement about said fixed axis and having (n—1) number of external teeth disposed to intermesh with said internal teeth of said stator means, said rotor means being also disposed for rotational movement about its own axis, whereby said rotor means has a combined rotor movement comprising said orbital and rotational movements, said self-timing means comprising stationary member means disposed in a stationary position relative to said stator means and shaft means common to both said rotary valve means and said rotor means, said shaft means having first connection means with said rotor means and second connection means with said rotary valve means to rotate same, said first connection means comprising female spline teeth in said rotor means and male spline teeth on said shaft means, said female and male spline teeth being angularly indexible with respect to each other and having a plurality of selectable angular positions therebetween, said shaft means having a combined shaft movement partaking that of said rotor means, said stationary member means having internal wall means defining a shaft opening, said internal wall means having (n) number of internal wall portions, said shaft means having (n—1) number of external wall portions, said internal wall portions and said external wall portions confronting each other and effecting a confining wall relationship therebetween in successive order as said shaft means moves through said combined shaft movement, said confining wall relationship self-locating said shaft means and said male spline teeth thereon in substantially a correct timed-position with respect to said rotary valve means, whereby said rotary valve means is automatically self-timed with respect to said rotor means upon assembly of said rotor means on said self-located shaft means and within said stator means for operation therein.

2. The structure of claim 1, wherein said confining wall relationship has a circumferential tolerance therebetween less than the circumferential width of a spline tooth.

3. The structure of claim 1, having a stationary valve member means against which said rotary valve sealingly engages, said stationary valve member means including said stationary member means.

4. The structure of claim 1, wherein said internal wall portions define substantially an internal polygon having (n) number of sides.

5. The structure of claim 4, wherein said external wall portions define substantially an external polygon having (n—1) number of sides.

References Cited
UNITED STATES PATENTS

| | | | |
|---|---|---|---|
| 3,289,542 | 12/1966 | Fikse | 91—56 |
| 3,405,603 | 10/1968 | Woodling | 91—56 |
| 3,452,680 | 7/1969 | White | 103—130 |

EVERETTE A. POWELL, JR., Primary Examiner

U.S. Cl. X.R.

103—130